(12) United States Patent
Yanagibayashi et al.

(10) Patent No.: US 11,946,585 B2
(45) Date of Patent: Apr. 2, 2024

(54) BIOINERT PIPING

(71) Applicant: SHIMADZU CORPORATION, Kyoto (JP)

(72) Inventors: Jun Yanagibayashi, Kyoto (JP); Kenichi Yasunaga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/710,318

(22) Filed: Mar. 31, 2022

(65) Prior Publication Data

US 2022/0341513 A1    Oct. 27, 2022

(30) Foreign Application Priority Data

Apr. 27, 2021  (JP) ................. 2021-075059

(51) Int. Cl.
*F16L 9/00*    (2006.01)
*B29C 63/34*   (2006.01)
*F16L 9/18*    (2006.01)
*B29L 23/00*   (2006.01)

(52) U.S. Cl.
CPC ............. *F16L 9/006* (2013.01); *B29C 63/341* (2013.01); *F16L 9/18* (2013.01); *B29L 2023/22* (2013.01)

(58) Field of Classification Search
CPC ............................ B21B 1/18; Y10T 29/49991
USPC .......... 138/140, 141, 143, 109; 72/224, 234; 29/527.7
See application file for complete search history.

(56) References Cited

U.S. PATENT DOCUMENTS

| | | | | |
|---|---|---|---|---|
| 3,517,537 A | * | 6/1970 | Cofer ................. | B22D 11/1206 72/336 |
| 4,044,586 A | * | 8/1977 | Properzi ............. | B21B 3/003 72/224 |
| 4,191,041 A | * | 3/1980 | Brauer .............. | B21B 1/18 72/235 |
| 4,391,117 A | * | 7/1983 | Demny ............. | B21B 1/18 72/224 |
| 4,512,177 A | * | 4/1985 | Hayashi ............ | B21B 1/20 72/368 |
| 4,559,799 A | * | 12/1985 | Funke .............. | B21B 1/18 72/224 |

(Continued)

FOREIGN PATENT DOCUMENTS

JP    S56115175 A   5/1987
KR    101708647 B1   2/2017

OTHER PUBLICATIONS

Office Action for corresponding CN Application No. 202210244614.9 dated Jul. 27, 2023 with machine translation.

*Primary Examiner* — Patrick F Brinson
(74) *Attorney, Agent, or Firm* — Renner, Otto, Boisselle & Sklar, LLP

(57) ABSTRACT

A bioinert piping (1) that has a flow path (2) provided inside and a main body portion (10) between end portions (8, 8) includes a resin tube (4) that forms an inner wall of the flow path (2) over an entire length of the flow path (2), and a metal tube (6) that accommodates the resin tube (4) inside so as to cover the outer peripheral surface of the resin tube (4) over at least an entire length of the main body portion (10). The metal tube (6) is plastically deformed toward an inner side so that the outer peripheral surface of the resin tube (4) and an inner peripheral surface of the metal tube (6) are in liquid-tight contact with each other.

3 Claims, 4 Drawing Sheets

(56) References Cited

U.S. PATENT DOCUMENTS

| | | | | |
|---|---|---|---|---|
| 5,924,320 A * | 7/1999 | Michisaka | ............ | B21C 35/023 72/305 |
| 9,056,264 B2 | 6/2015 | Hahn | | |
| 9,494,563 B2 | 11/2016 | Falk-Jordan | | |
| 10,018,604 B2 | 7/2018 | Burger | | |
| 2007/0068872 A1 * | 3/2007 | Gerhardt | ................ | G01N 30/32 73/61.53 |
| 2012/0024411 A1 * | 2/2012 | Hahn | ...................... | F16L 19/06 138/140 |
| 2015/0308588 A1 * | 10/2015 | Hahn | ................... | F16L 19/041 138/109 |
| 2016/0116088 A1 | 4/2016 | Graham | | |

* cited by examiner

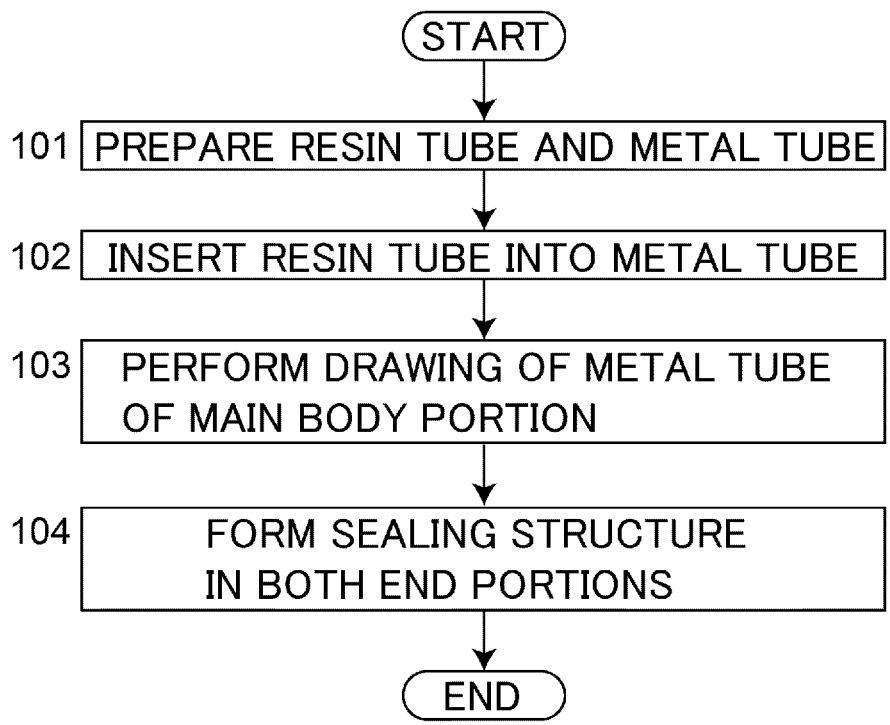
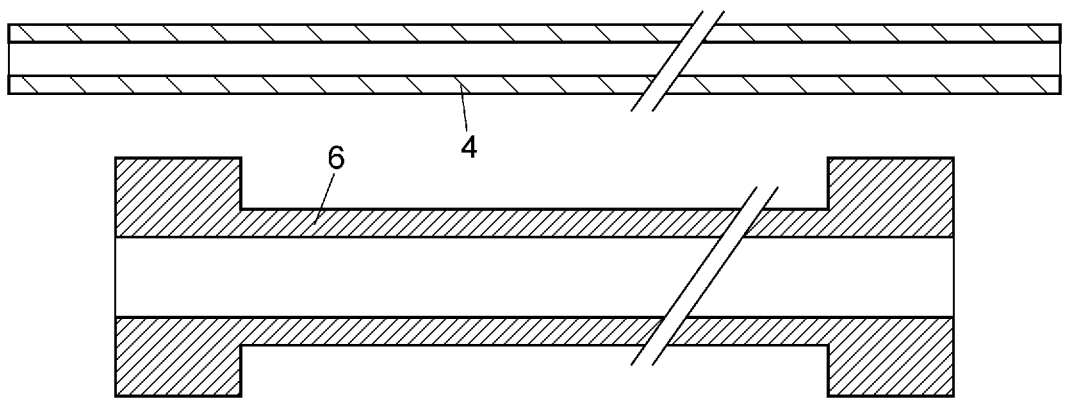

BIOINERT PIPING

BACKGROUND OF THE INVENTION

1. Field of the Invention

The present invention relates to a bioinert piping used as a piping of an analysis device such as a liquid chromatograph.

2. Description of the Related Art

A liquid chromatograph (hereinafter, LC) is configured by connecting constituent elements such as a liquid delivery pump, an injector, a column, and a detector by a piping. Since mechanical strength is particularly required for a portion constituting a path through which a mobile phase flows in a high pressure state, a metal material is generally used for the portion.

In contrast, a sample may contain a component that interacts with metal. For example, in addition to components such as protein, peptide, and nucleic acid, a specific type of an agrochemical component forms a complex with metal and strongly interact with the metal. For this reason, when a sample containing such a component comes into contact with metal, the component interacts with the metal to generate adsorption, which may cause an undesirable effect such as tailing of a component peak in a chromatogram, a decrease in detection sensitivity, or no detection of the component at all.

For this reason, it has been proposed that metal be not used for a wetted portion of an injector, a column, a detector, and a piping, and only a low adsorptive material such as resin and ceramic be used. According to the proposed method, since a component in a sample does not come into contact with metal while flowing inside the injector, column, detector, and piping, the risk of the adsorption as described above and a resulting undesirable effect can be reduced.

As described above, an LC system in which no metal is present in a wetted portion with a sample is referred to as a bioinert LC. As a piping used for the bioinert LC, a bioinert piping in which the outer side of a resin tube is covered with a metal tube to improve mechanical strength while suppressing adsorption of a sample inside the piping has been proposed (see JP S62-115175 Y, U.S. Pat. No. 9,056,264B2, US2016/116088A1, U.S. Ser. No. 10/018,604B2, and U.S. Pat. No. 9,494,563B2).

SUMMARY OF THE INVENTION

The bioinert piping is generally formed by inserting a resin tube inside a metal tube, and fixing the resin tube to the metal tube in both end portions. Since the resin tube is inserted inside the metal tube, a gap of about 20 to 50 μm is designed to be formed between an inner peripheral surface of the metal tube and an outer peripheral surface of the resin tube in consideration of an inner diameter tolerance of the metal tube and an outer diameter tolerance of the resin tube.

In an LC, an internal pressure of several tens of MPa or more may be applied to a piping through which a mobile phase flows. In a case where analysis is performed under a high pressure condition by using the bioinert piping as described above, the resin tube is elastically and/or plastically deformed until the gap with the metal tube disappears, and the resin tube is mechanically supported by the metal tube without the gap with the metal tube, so that the resin tube can withstand an internal pressure of several tens of MPa or more.

However, the deformation of the resin tube as described above has undesirable influences on analysis. As one of the influences, there is an influence due to an increase in a flow path diameter in the piping. For example, in a case where an original inner diameter of the resin tube is designed to be 100 μm, when the inner diameter of the resin tube is increased by 20 to 50 μm, the inner diameter of the flow path is increased accordingly, which has a non-negligible adverse effect on separation of a sample. Furthermore, since an expansion width of the flow path diameter in the piping due to internal pressure is determined by the inner diameter tolerance of the metal tube and the outer diameter tolerance of the resin tube, an individual difference occurs for each piping. As a result, not only separation performance as an LC is adversely affected, but also inter-device reproducibility is deteriorated.

Further, in a case where the gap between the inner peripheral surface of the metal tube and the outer peripheral surface of the resin tube is large, the degree of plastic deformation of the resin tube due to the internal pressure may exceed a limit, leading to partial breakage. In this case, a mobile phase and a sample leak to the outside of the resin tube, which adversely affects analysis.

The present invention has been made in view of the above problems, and an object of the present invention is to provide a bioinert piping in which an inner diameter tolerance of a metal tube and an outer diameter tolerance of a resin tube have little influence on analysis.

A bioinert piping according to the present invention is a bioinert piping that is used in an analysis device, and has a flow path provided inside, end portions, and a main body portion provided between the end portions. The bioinert piping includes a resin tube that forms an inner wall of the flow path over an entire length of the flow path, and a metal tube that accommodates the resin tube inside so as to cover an outer peripheral surface of the resin tube over at least an entire length of the main body portion. The metal tube is plastically deformed toward an inner side so that the outer peripheral surface of the resin tube and an inner peripheral surface of the metal tube are in liquid-tight contact with each other.

A method according to the present invention is a manufacturing method of a bioinert piping that is used in an analysis device, and has a flow path provided inside, end portions, and a main body portion provided between the end portions. The manufacturing method includes the steps of preparing a resin tube and a metal tube, the metal tube having an inner diameter larger than an outer diameter of the resin tube so that the resin tube can be inserted inside the metal tube, inserting the resin tube inside the metal tube after the step of preparing, and plastically deforming the metal tube toward an inner side, after the step of inserting, by pressurizing an outer peripheral surface of a portion of the metal tube corresponding to the main body portion, so that an outer peripheral surface of the resin tube and an inner peripheral surface of the metal tube in the main body portion of the bioinert piping are brought into liquid-tight contact with each other.

According to the bioinert piping of the present invention, the metal tube is plastically deformed toward an inner side, so that the outer peripheral surface of the resin tube and the inner peripheral surface of the metal tube are in liquid-tight contact with each other. Therefore, a bioinert piping in which an inner diameter tolerance of the metal tube and an outer diameter tolerance of the resin tube have little influence on analysis is provided.

According to the method of the present invention, after the resin tube is inserted into the metal tube, the metal tube is plastically deformed by pressurization of the outer peripheral surface of the metal tube so that the outer peripheral surface of the resin tube and the inner peripheral surface of the metal tube in the main body portion of the bioinert piping are brought into liquid-tight contact with each other. Therefore, a bioinert piping in which an inner diameter tolerance of the metal tube and an outer diameter common difference of the resin tube have little influence on analysis is provided.

BRIEF DESCRIPTION OF THE DRAWINGS

FIGS. 1A and 1B are diagrams illustrating an embodiment of a bioinert piping, in which FIG. 1A is a cross-sectional view in a direction along a flow path, and FIG. 1B is a cross-sectional view at a position X-X in FIG. 1(A);

FIG. 2 is a flowchart illustrating an example of a manufacturing method of a bioinert piping of the embodiment;

FIG. 3A-3D is a process diagram for explaining the manufacturing method; and

DETAILED DESCRIPTION OF THE INVENTION

A liquid chromatograph as an example of an analysis device according to the present invention is configured such that constituent elements such as a liquid delivery pump, an injector, a column, and a detector are connected by a bioinert piping according to the present invention. Hereinafter, the bioinert piping and a manufacturing method of the bioinert piping according to the present invention will be described with reference to the drawings.

Figure 1A:
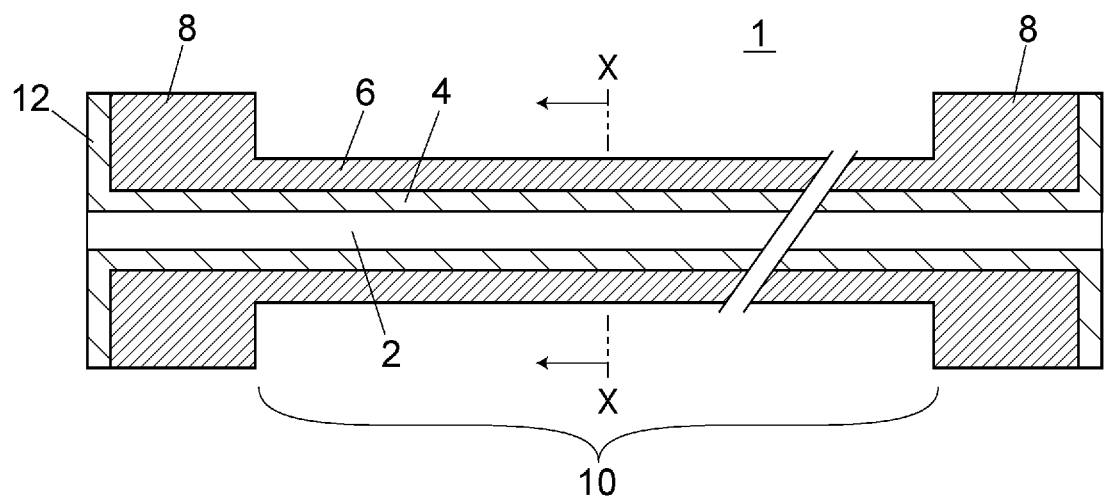

As illustrated in FIG. 1A, a bioinert piping 1 has a structure in which an inner wall surface of a flow path 2 for allowing a mobile phase to flow is formed of a resin tube 4, and an outer peripheral surface of the resin tube 4 is covered with a metal tube 6. The bioinert piping 1 includes end portions 8 connected to another piping and the like and a main body portion 10 between the end portions 8. Both of the end portions 8 and the main body portion 10 are formed of a double structure of the resin tube 4 and the metal tube 6. The thinner a piping, the better the bendability and the easier the connecting work of the piping becomes. However, since the end portions 8 need to be adjusted to the size of a port to which the end portions 8 are connected, an outer diameter of the metal tube 6 at the end portions 8 is larger than an outer diameter of the main body portion 10.

At both ends of the bioinert piping 1, the resin tube 4 protruding from the metal tube 6 is bent in a radial direction of the flow path 2 along the shape of an end surface of the metal tube 6 to form a flange portion 12, by which a gap between the resin tube 4 and the metal tube 6 at both ends is sealed, and metal does not appear in a wetted portion with a mobile phase.

Figure 1B:
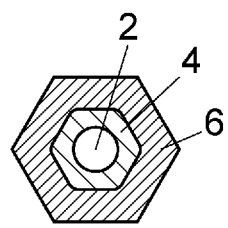

The metal tube 6 is plastically deformed by pressure processing toward the inner peripheral side. Due to this plastic deformation, an outer peripheral surface of the resin tube 4 and an inner peripheral surface of the metal tube 6 are in liquid-tight contact with each other. In a preferred embodiment, as illustrated in FIG. 1B, the main body portion 10 of the bioinert piping 1 is pressurized so that an outer shape of a cross section of the metal tube 6 in a direction perpendicular to the flow path 2 becomes polygonal (more preferably hexagonal), and is plastically deformed toward the inner peripheral side. The resin tube 4 is in a state in which the outer peripheral surface of the resin tube 4 is supported by the metal tube 6 in a state in which no mobile phase flows through the flow path 2 inside, that is, in a state in which no internal pressure is applied to the resin tube 4, and even when an internal pressure of several tens of MPa is applied to the resin tube 4, deformation of the resin tube 4 and expansion of an inner diameter of the flow path 2 are suppressed. Note that, in the present embodiment, an outer shape of a cross section of the metal tube 6 in the main body portion 10 is a hexagon. However, the present invention is not limited to this shape, and may be a circle or a polygon other than a hexagon.

An example of the manufacturing method of the bioinert piping 1 described above will be described with reference to FIGS. 2 and 3A-3D.

First, the resin tube 4 having a cylindrical shape and the metal tube 6 having a cylindrical shape that is shorter in the flow path direction than the resin tube 4 are prepared (FIG. 2: Step 101, FIG. 3A). The prepared metal tube 6 is designed to have an inner diameter slightly larger than an outer shape of the resin tube 4 so that the resin tube 4 can be inserted inside.

The resin tube 4 is inserted into the metal tube 6 such that both end portions of the resin tube 4 protrude from both ends of the metal tube 6 (FIG. 2: Step 102, FIG. 3B). In this state, a gap of about several tens of μm exists between an outer peripheral surface of the resin tube 4 and an inner peripheral surface of the metal tube 6, and the resin tube 4 and the metal tube 6 are not fixed to each other.

Figure 3B:
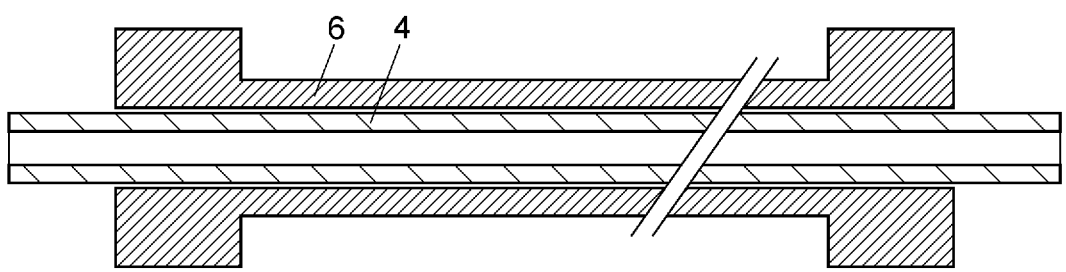
Figure 3C:
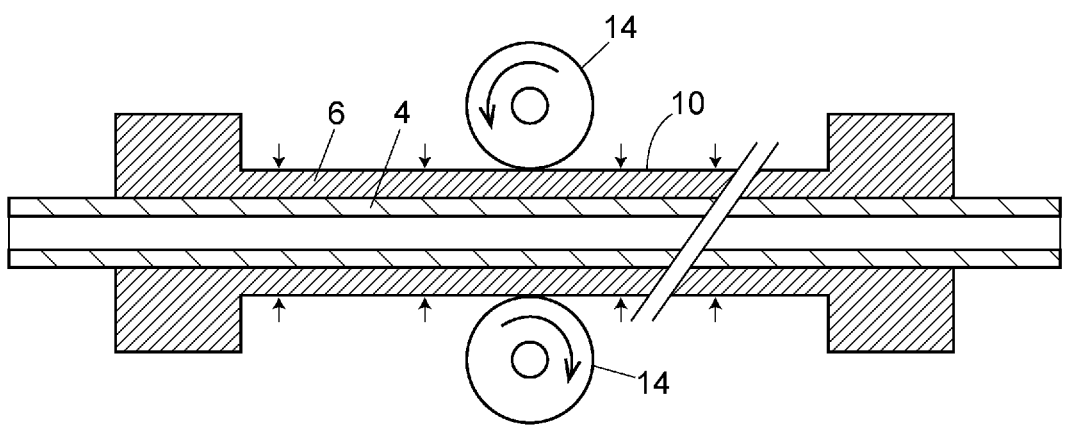
Figure 3D:
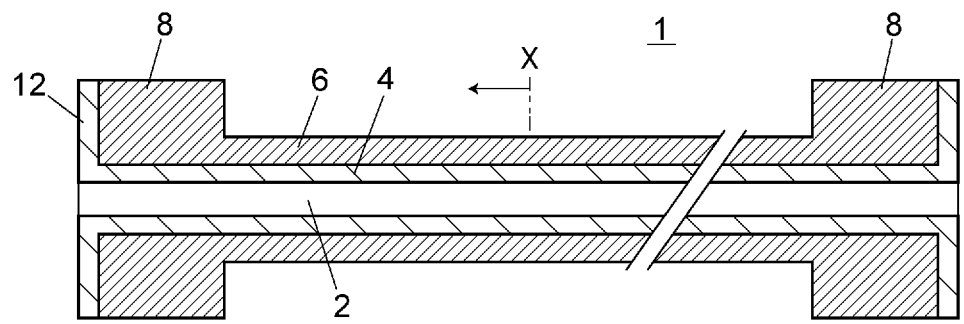

Next, the metal tube 6 is drawn, and the outer peripheral surface of the resin tube 4 and the inner peripheral surface of the metal tube 6 in the main body portion 10 are brought into liquid-tight contact with each other. Specifically, a plurality of rollers 14 are used to uniformly pressurize an outer peripheral surface of the metal tube 6 in the main body portion 10 from a circumferential direction to plastically deform the metal tube 6 so as to crush the gap between the outer peripheral surface of the resin tube 4 and the inner peripheral surface of the metal tube 6, and an outer shape of a cross section is made hexagonal (FIG. 2: Step 103, FIG. 3C). In FIG. 3C, an end portion is also plastically deformed. However, a sufficient effect can be obtained even when only the main body portion is plastically deformed.

After the above, heat is applied to the resin tube 4 protruding from both ends of the metal tube 6 to deform the resin tube 4 along an end surface of the metal tube 6, so that a sealing structure including the flange portions 12 is formed at both ends of the resin tube 4 (FIG. 2: Step 104, FIG. 3D).

Figure 4:
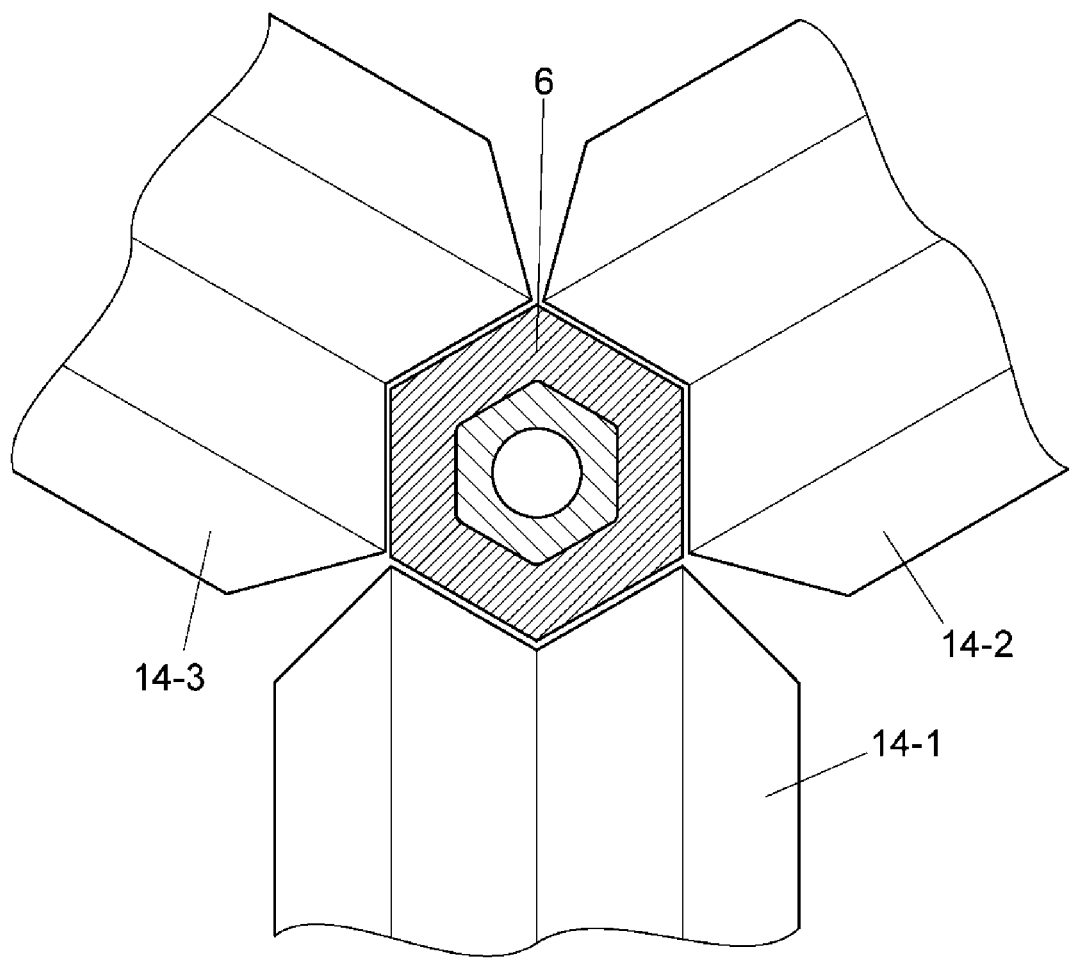
FIG. 4 is an example of a configuration of a roller used for drawing.

As illustrated in FIG. 4, the drawing process of the metal tube 6 can be performed by uniformly pressing three rollers 14-1 to 14-3 provided with a V-shaped groove on a roller surface against the outer peripheral surface of the metal tube 6 from three directions forming an angle of 120 degrees with each other. Note that this is an example, and any method may be used as long as the outer peripheral surface of the metal tube 6 in the main body portion 10 can be uniformly pressurized to make an outer diameter shape polygonal.

As a result of trying various drawing methods such as a method of pressing a plurality of rollers having an arc-shaped roller surface against the metal tube 6, the present inventors have found that stable processing accuracy can be obtained by processing of making a cross section polygonal.

When an attempt has been made to draw an outer diameter while maintaining an outer shape of a cross section of the metal tube 6 in a circular shape, buckling deformation may have occurred at an indefinite portion. In contrast, when processing is performed such that the outer shape of the cross section of the metal tube 6 becomes a polygon having a plurality of vertices, the buckling of the metal tube 6 is dispersed to a plurality of vertex portions, and the buckling deformation at an indefinite position is suppressed. In particular, as illustrated in FIG. 4, it has been found that when the metal tube 6 is processed so that the outer shape of the cross section of the metal tube 6 becomes a regular hexagon, buckling deformation hardly occurs at such an indefinite portion.

The bioinert piping 1 can be used as a piping that connects constituent elements of a liquid chromatograph. By using the bioinert piping 1 as a piping of a liquid chromatograph, it is possible to prevent a component in a sample from being adsorbed on an inner wall surface of the piping and to suppress expansion of an inner diameter of a flow path due to internal pressure during analysis.

The embodiment described above is merely an example of the embodiment of the bioinert piping and the manufacturing method of the bioinert piping according to the present invention, and the embodiment of the bioinert piping and the manufacturing method of the bioinert piping according to the present invention is as described below.

In the embodiment of a bioinert piping according to the present invention, a bioinert piping (1) that is used for an analysis device, and has a flow path (2) provided inside, end portions (8, 8), and a main body portion (10) provided between the end portions (8, 8) includes a resin tube (4) that forms an inner wall of the flow path (2) over an entire length of the flow path (2), and a metal tube (6) that accommodates the resin tube (4) inside so as to cover an outer peripheral surface of the resin tube (4) over at least an entire length of the main body portion (10). The metal tube (6) is plastically deformed toward the inner side so that the outer peripheral surface of the resin tube (4) and an inner peripheral surface of the metal tube (6) are in liquid-tight contact with each other. The resin tube (4) is in a state of being supported with the outer peripheral surface of the resin tube (4) in contact with the metal tube (6), in a state in which no fluid flows through the flow path (2) inside, that is, in a state in which no internal pressure is applied to the resin tube (4). Therefore, even if internal pressure is applied to the resin tube (4) due to flow of a fluid during analysis of an analysis device, deformation of the resin tube (4) and expansion of an inner diameter of the flow path (2) are suppressed. As a result, it is possible to prevent deterioration of analysis performance in the analysis device and breakage of the resin tube (4).

In a specific aspect of the embodiment, in the main body portion, an outer shape of a cross section, which is perpendicular to the flow path, of the metal tube is plastically deformed into a polygonal shape. When processing is performed such that the outer shape of the cross section of the metal tube becomes a polygon having a plurality of vertices, the buckling of the metal tube is dispersed to a plurality of vertex portions, and an accompanying effect that the buckling deformation at an indefinite position is suppressed is obtained.

In a specific aspect of the embodiment, in the main body portion, the cross section, which is perpendicular to the flow path, of the metal tube is plastically deformed into a hexagonal shape. According to such an aspect, it is possible to improve the manufacturing yield of the bioinert piping.

The embodiment of a method according to the present invention is a manufacturing method of a bioinert piping that is used in an analysis device, and has a flow path provided inside, end portions, and a main body portion provided between the end portions. The manufacturing method includes the steps of preparing a resin tube and a metal tube, the metal tube having an inner diameter larger than an outer diameter of the resin tube so that the resin tube can be inserted inside the metal tube, inserting the resin tube inside the metal tube after the step of preparing, and plastically deforming the metal tube to inner, after the step of inserting, by pressurizing an outer peripheral surface of a portion of the metal tube corresponding to the main body portion, so that an outer peripheral surface of the resin tube and an inner peripheral surface of the metal tube in the main body portion of the bioinert piping are brought into liquid-tight contact with each other.

In a first aspect of the embodiment of the method, in the step of plastically deforming the metal tube, an outer shape of a cross section, which is perpendicular to the flow path, of the portion of the metal tube is plastically deformed into a polygonal shape by pressurizing an outer peripheral surface of the portion of the metal tube corresponding to the main body portion from a plurality of directions uniformly, so that the outer peripheral surface of the resin tube and the inner peripheral surface of the metal tube in the main body portion of the bioinert piping are brought into liquid-tight contact with each other.

In a second aspect of the embodiment of the method, in the step of plastically deforming the metal tube, rollers (14) are simultaneously pressed against an outer peripheral surface of the metal tube (6) from the plurality of directions to continuously pressurize the outer peripheral surface over an entire length of the main body portion (10).

As a more specific aspect of the above two aspects, in the step of plastically deforming the metal tube, a plurality of rollers (14) provided with a V-shaped groove are pressed against the outer peripheral surface of the metal tube (6) to perform pressurization. According to such an aspect, an outer diameter in the cross section perpendicular to the flow path of the metal tube can be easily processed into a polygonal shape.

In the case of the above, in the step of plastically deforming the metal tube, three rollers (14-1 to 14-3) provided with a V-shaped groove are pressed against the outer peripheral surface of the metal tube (6) to perform pressurization, so that an outer shape of a cross section perpendicular to the flow path of the metal tube (6) is plastically deformed into a hexagonal shape. In this manner, in the step of bringing into contact with each other, it is possible to effectively suppress occurrence of buckling deformation in an indefinite location of the metal tube, and the manufacturing yield of the bioinert piping is improved.

DESCRIPTION OF REFERENCE SIGNS 1 bioinert piping
2 flow path
4 resin tube
6 metal tube
8 end portions
10 main body portion
12 flange portion
14, 14-1 to 14-3 roller

What is claimed is:

1. A bioinert piping that is used in an analysis device, and has a flow path provided inside, end portions, and a main body portion provided between the end portions, the bioinert piping comprising:
  a resin tube that forms an inner wall of the flow path over an entire length of the flow path; and
  a metal tube that accommodates the resin tube inside so as to cover an outer peripheral surface of the resin tube over at least an entire length of the main body portion, wherein
  the metal tube is plastically deformed toward an inner side so that the outer peripheral surface of the resin tube and an inner peripheral surface of the metal tube are in liquid-tight contact with each other, and
  in the main body portion, an outer shape of a cross section, which is perpendicular to the flow path, of the metal tube is plastically deformed into a polygonal shape.

2. The bioinert piping according to claim 1, wherein in the main body portion, the cross section, which is perpendicular to the flow path, of the metal tube is plastically deformed into a hexagonal shape.

3. A liquid chromatograph in which constituent elements are fluidly connected by the bioinert piping according to claim 1.

* * * * *